United States Patent
Pena et al.

(10) Patent No.: US 7,552,127 B2
(45) Date of Patent: Jun. 23, 2009

(54) SYSTEM AND METHOD FOR PROVIDING PLATFORM-INDEPENDENT CONTENT SERVICES FOR USERS FOR CONTENT FROM CONTENT APPLICATIONS LEVERAGING ATOM, XLINK, XML QUERY CONTENT MANAGEMENT SYSTEMS

(75) Inventors: Ronny A. Pena, New York, NY (US); Derek W. Carr, Apex, NC (US); Carol A. Jones, Raleigh, NC (US); Michael A. Wanderski, Durham, NC (US); Ajamu A. Wesley, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 11/612,772

(22) Filed: Dec. 19, 2006

(65) Prior Publication Data

US 2008/0147672 A1    Jun. 19, 2008

(51) Int. Cl.
G06F 17/30 (2006.01)
(52) U.S. Cl. .................. 707/10; 707/2; 707/3; 707/5
(58) Field of Classification Search ............... 707/2–10; 715/501.1
See application file for complete search history.

(56) References Cited

U.S. PATENT DOCUMENTS

| 6,910,040 B2 | 6/2005 | Emmick et al. |
| 7,010,568 B1 | 3/2006 | Schneider et al. |
| 7,013,303 B2 | 3/2006 | Faybishenko et al. |
| 2004/0215635 A1 | 10/2004 | Chang et al. |
| 2004/0249795 A1 | 12/2004 | Brockway et al. |
| 2005/0177560 A1 | 8/2005 | Morioka |
| 2005/0257056 A1 | 11/2005 | Morita et al. |
| 2006/0021014 A1 | 1/2006 | Hartman et al. |
| 2006/0031204 A1 | 2/2006 | Liu et al. |
| 2006/0047646 A1 | 3/2006 | Maluf et al. |
| 2006/0156220 A1* | 7/2006 | Dreystadt et al. ......... 715/501.1 |
| 2006/0253489 A1* | 11/2006 | Kahn et al. .................. 707/102 |
| 2007/0055748 A1* | 3/2007 | Kim et al. .................... 709/219 |
| 2007/0078904 A1* | 4/2007 | Yoon et al. ................... 707/200 |

OTHER PUBLICATIONS

Fukumura et al., "Realization of Personalized Presentation for Digital Contents Based on Browsing History", pp. 605-608, IEEE 2003.

\* cited by examiner

*Primary Examiner*—Etienne P LeRoux
*Assistant Examiner*—Cindy Nguyen
(74) *Attorney, Agent, or Firm*—Ayla Lari; Hoffman Warnick LLC

(57) ABSTRACT

The system and method of the present invention provides a solution to allow users to receive platform-independent content services on content from content applications, such as blogs, wikis and eForms. It utilizes the Atom, XLink and XML Query (XQuery) formats and protocols with a content management system (CMS) which supports these formats and protocols. In the preferred embodiment, XML eForms, such as Workplace Forms, Adobe Forms, and Microsoft Info-Path is used as an example to describe the architecture, the system and method of the present invention although the invention can be applied to the various content applications mentioned above. In another embodiment of the present invention, unstructured content is converted to structured content via UIMA so that the content services may be offered to the user on the content. It transforms the content to a form more desirable to the user prior to delivering the delivering the content. The content is delivered in an XML document and is summarized for the user.

21 Claims, 6 Drawing Sheets

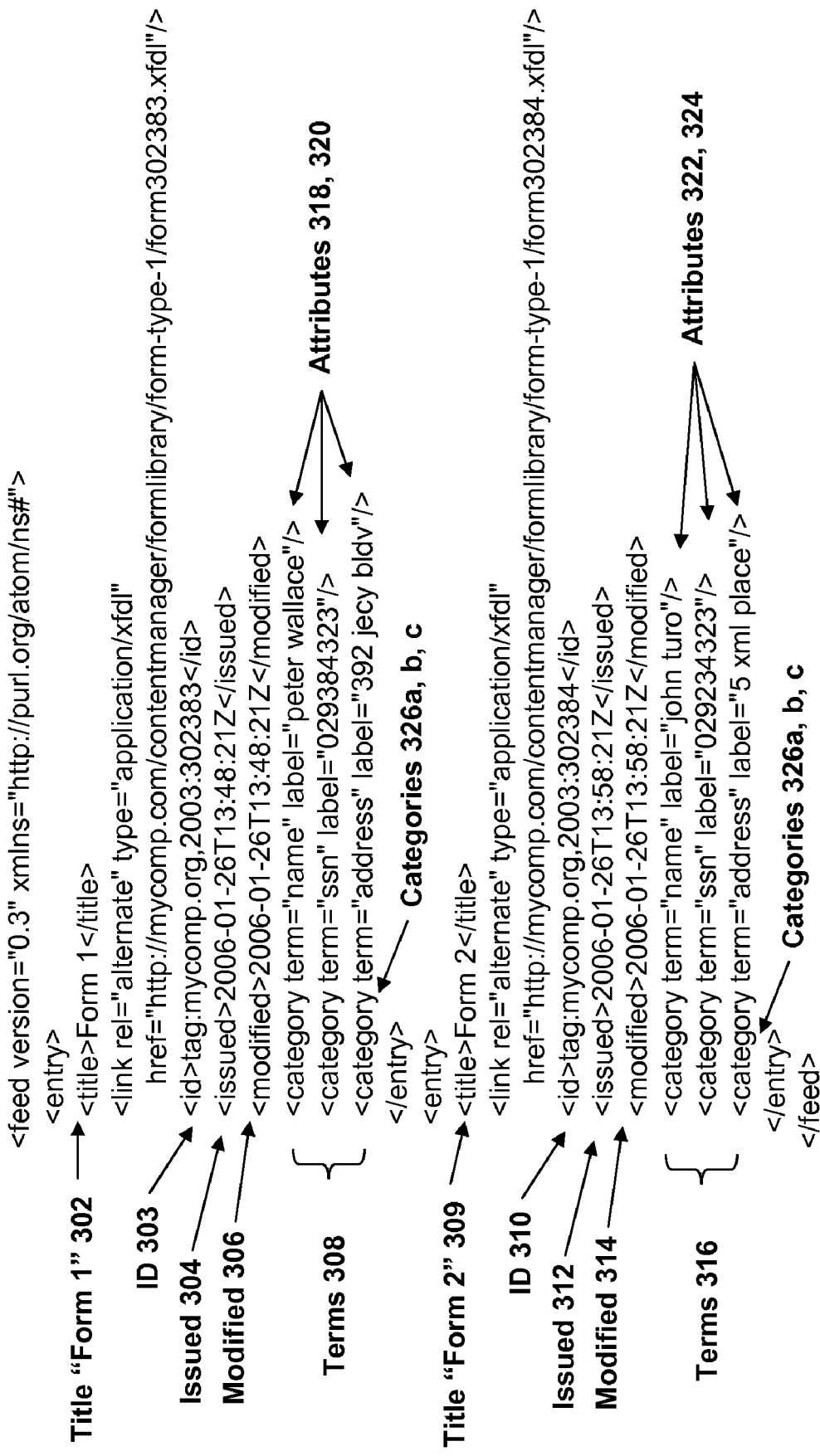

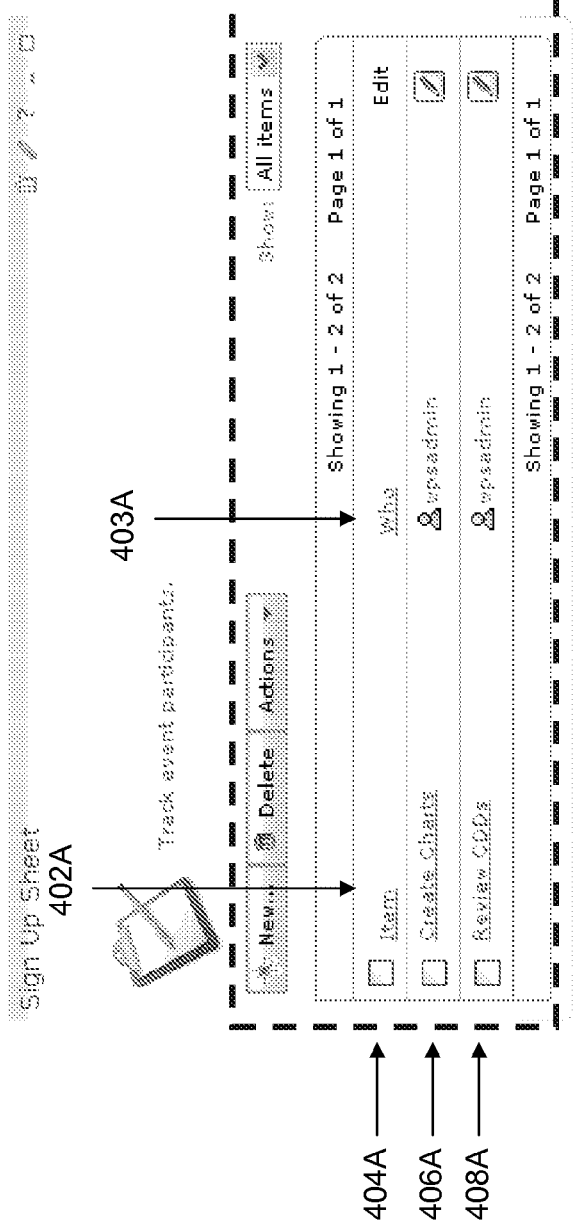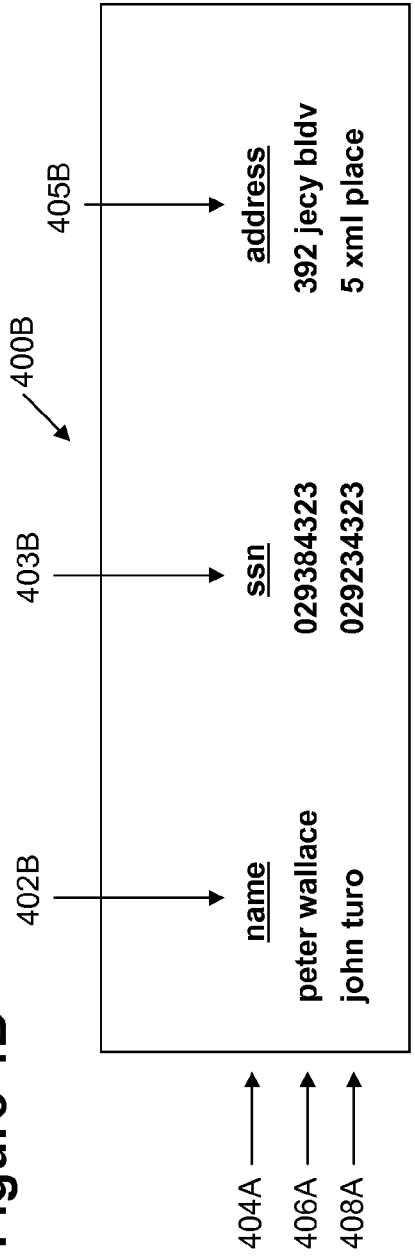
Figure 4A
404A
406A
408A
Figure 4B
404A
406A
408A

SYSTEM AND METHOD FOR PROVIDING PLATFORM-INDEPENDENT CONTENT SERVICES FOR USERS FOR CONTENT FROM CONTENT APPLICATIONS LEVERAGING ATOM, XLINK, XML QUERY CONTENT MANAGEMENT SYSTEMS

FIELD OF THE INVENTION

The invention relates generally to a content from content applications, and, more particularly, to a system and method for providing platform-independent content services to users for content from content applications leveraging Atom, XLink, XML Query (XQuery) Content Management Systems (CMSs).

BACKGROUND OF THE INVENTION

With the evolution of the Internet and the ever-increasing bandwidth (channel capacity and data (information) transmission rates), the use of digital content as a means of gaining information by individuals has become very convenient and popular. For enterprise businesses, the use of digital content (hereinafter "content") is critical to the success of the business.

Along with the increased usage and importance of content on the Web, the shear volume of content has increased dramatically in recent years. This makes it difficult to parse out the relevant information from the irrelevant information. Information overload is a common complaint and causes wasted time and loss of revenue.

In response to this problem, tools and schemes have been created to help alleviate this issue. These tools and schemes are designed to assist in sorting out the web information so that the user is able to receive the information relevant to the user. One important innovation is the web feed. A web feed is a data format used for serving users frequently updated content. Content distributors syndicate a web feed, thereby allowing users to subscribe to it. Making a collection of web feeds accessible in one spot is known as aggregation.

In the typical scenario of using web feeds, a content provider publishes a feed link on its site which end users can register with an aggregator program (also called a feed reader or a news reader) running on their own machines; doing this is usually as simple as dragging the link from the web browser to the aggregator. When instructed, the aggregator asks all the servers in its feed list if they have new content; if so, the aggregator either makes a note of the new content or downloads it. Aggregators can be scheduled to check for new content periodically.

The kinds of content delivered by a web feed are typically HTML (webpage content) or links to webpages and other kinds of digital media. Often when websites provide web feeds to notify users of content updates, they only include summaries in the web feed rather than the full content itself.

Another important innovation in content management is the aptly named "content management system". A content management system is a computer software system for organizing and facilitating collaborative creation of documents and other content.

Enterprise companies are especially dependent upon content management systems. Typical applications are collaboration, document management, workflow, web content management (including web portals), and records management. Some examples of enterprise content management systems are IBM's Lotus® Domino® and DB2® Content Management systems, Microsoft's Sharepoint system, and Oracle's Content Management product. There are many others.

This can be seen as web feed system 500 in FIG. 5. System 500 has a content management system (CMS) 502 connected to user 504 via feed reader (aggregator or news reader) 506. CMS 502 is also connected to web sites 508A, B, C (content providers). User 504 requests subscriptions to the content on web sites 508A, B, C by sending subscription requests 514A, B, C to web sites 508A, B, C via feed reader 506 and CMS 502. Web sites 508A, B, C reply with OKs 516A, B, C followed by content 518A, B, C which is passed to feed reader 506 via CMS 506. Feed reader 506 summarizes the content and passes a content summary 520 of the content 518A, B, C to the user 504.

Content applications are becoming an important part of enterprise business. Blogs, wikis, web content management, and eForms are some examples of content applications. A defining characteristic of content applications is the ease with which content can be created and updated by the general public. Most content application content is open to the general public without the need to register to view or sometimes update (as in the case of wikis and eForms). Many edits in these content applications can be made in real-time, and appear almost instantaneously online. A blog (short for weblog) is a personal online journal that is frequently updated and intended for general public consumption. Blogs are defined by their format: a series of entries posted to a single page in reverse-chronological order. A wiki is a type of Web site that allows the visitors themselves to easily add, remove, and otherwise edit and change some available content, sometimes without the need for registration. This ease of interaction and operation makes a wiki an effective tool for collaborative authoring. An eForm (electronic form) is a computer program version of a paper form. Aside from eliminating the cost of printing, storing, and distributing pre-printed forms, and the wastage of obsolete forms, e-forms can be filled out faster because the programming associated with them can automatically format, calculate, look up, and validate information for the user.

These content applications are enabling employees to collaborate better and improve productivity as each allow for quick and easy conveyance of information to many people. (This is in contrast to email, text messaging, or instant messaging which are generally intended for one or a select, small group of people. Also, these "push" technologies require specific information about the intended recipients.)

The use of content applications generate loads of information, much of which is irrelevant or relevant to only some users. As such, it is important that the user has access to content services, such as searching, filtering, summarizing and sorting of the content generated by these content applications. These services assist the user to receive the information most relevant to him or her. However, presently, there is no simple and standard solution for providing content services to a user.

The content produced by these content applications may be saved in content management systems such as those discussed above. However, present content management systems (CMSs) have their own proprietary solution. This requires the developers and independent service vendors (ISVs) who wish to develop product to interface with all of the CMSs to learn the technology specific to each CMS. This is burdensome, time-consuming and wasteful. Today, there is no platform-independent public standard used by content management systems which represents how this content can be transmitted to a client and which represents how it's created, updated, or deleted from and by a client in a standard and simple fashion. For the purposes of this specification, "platform-specific" generally means specific to the content management system (CMS) while "platform-independent" generally means independent of the CMS accessing the feed readers.

In addition to the issues mentioned above, there is also a need to enable transformations on the content elements of the content being managed by a content management system. Content elements may comprise, inter alia, field limits, user IDs, etc. Many times, the content element of an eForm, for example, (or other piece of content) may have characteristics which are not of the desired form of the user. For example, the eForm might store an ID (such as the IBM WebSphere® Member manager ID (WMMID)) for a user of a portal which was selected using something equivalent to a people picker. (A "people picker" is a portion of an address book API which provides easy and quick access to the contents of a user's address book or other directory from any application. It offers a searchable, selectable list of people and groups that can be customized for an application.) However, it may be that the user wishes that the ID be resolved to an actual person's name. Another example is where there is a need to transform the content elements to meet the requirements of a particular display or device. For example, the user may want to truncate data to a certain limit per field because he/she is leveraging a feed reader on a handheld device, such as a PDA or PocketPC device, with limited system resources.

In view of the foregoing, a need exists to overcome these problems by providing a system and method for providing platform-independent content services to users for content from content applications leveraging Atom, XLink, XML Query (XQuery) Content Management Systems (CMSs).

BRIEF SUMMARY OF THE INVENTION

The system and method of the present invention provides a solution to allow users to receive platform-independent content services on content from content applications.

The system and method of the present invention utilize the Atom, XLink and XML Query (XQuery) formats and protocols with a content management system (CMS) which supports these formats and protocols.

In the preferred embodiment, XML eForms, such as Workplace Forms, Adobe Forms, and Microsoft InfoPath is used as an example to describe the architecture, the system and method of the present invention although the invention can be applied to the various content applications mentioned above.

In another embodiment of the present invention, unstructured content is converted to structured content via UIMA so that the content services may be offered to the user on the content.

In yet another embodiment, the system and method of the present invention transforms the content to a form more desirable to the user prior to delivering the delivering the content.

In another embodiment, the content is delivered in an XML document and is summarized for the user.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 3 is an exemplary depiction of the coding associated with an XML Return Document.

FIGS. 4A and 4B are exemplary depictions of the UT associated with the summarization function of the present invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
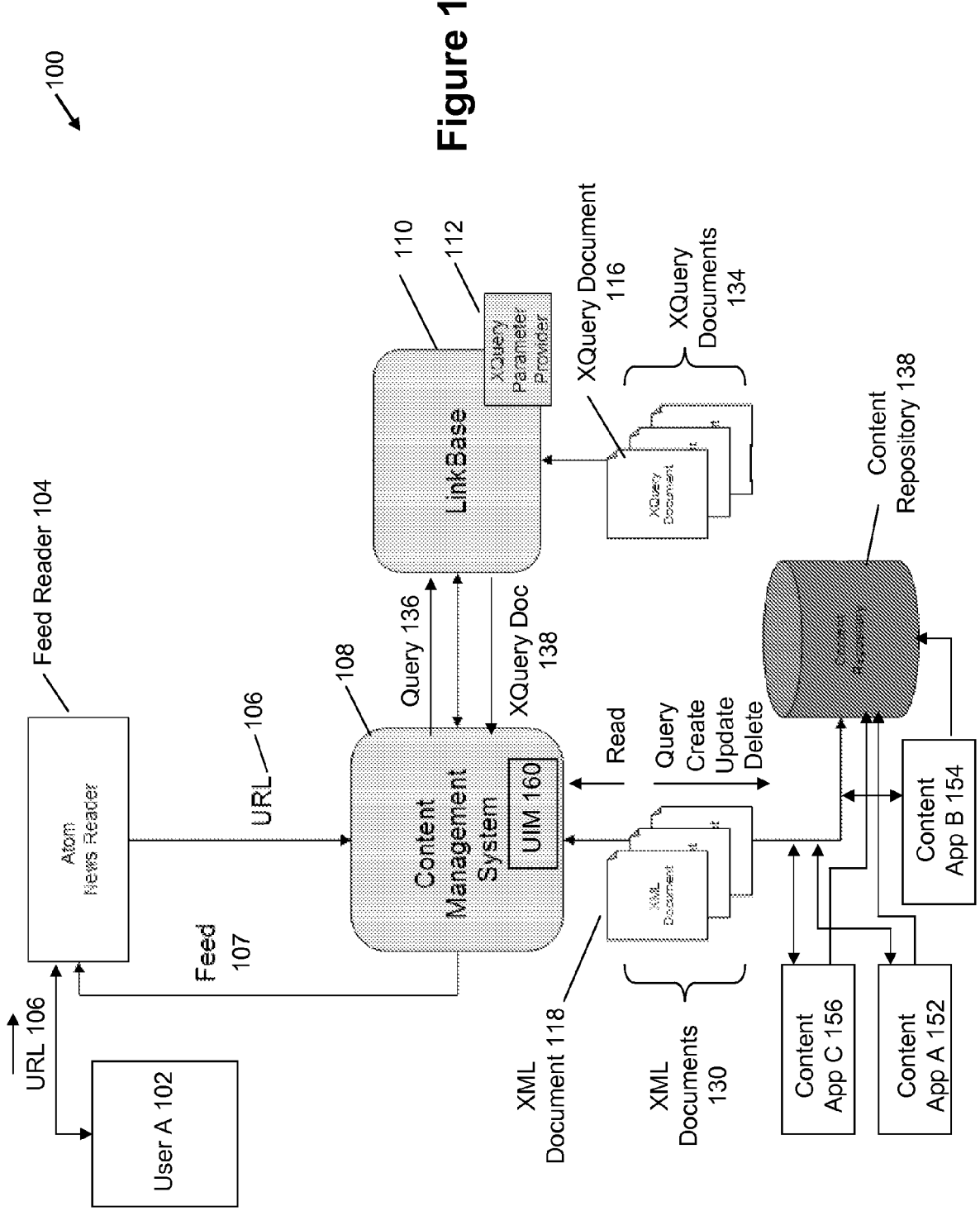
FIG. 1 is a block diagram showing the components of the platform-independent system of the present invention for providing content services to users on content feeds from content applications using an Atom, XLink, Xquery and XML content management system.

As used herein, unless otherwise noted, the term "set" means one or more (i.e., at least one) and the phrase "any solution" means any now known or later developed solution. Additionally, the term "data store" means any type of memory, storage device, storage system, and/or the like, which can temporarily or permanently store electronic data, and which can be included in a storage and/or memory hierarchy (collectively referred to herein as a "memory hierarchy") for a computer system.

The present invention can be applied to the various content applications mentioned above, but it will focus on XML eForms, such as IBM Workplace Forms, Adobe Forms, and Microsoft InfoPath to work as an example and describe the architecture.

The technologies used in the preferred embodiment are: Atom, XML, XLink, XPath functions, UIMA, and XQuery. XML is a standard for representing structured data in a declarative fashion. Since it is a worldwide standard, it is easy for application to interoperate with the data it is consuming and producing with other applications.

The Atom specification provides interaction model where user can subscribe to summaries of content which he/she is interested in. It also provides a protocol for performing CRUD (Create, Read, Update, and Delete) operations in a standard way. In the case of Atom, these operations would be Post, Get, Put, and Delete.

The Xlink specification defines a mechanism for linking XML documents to one another. Xlink has the concept of a LinkBase which can be used to manage links between various XML resources. p The XQuery specification provides a query language which enables an application or developer to search, filter, and summarize an XML document or a collection of XML documents. It is the platform-neutral query language which is supported across a wide array of data sources.

There is a large range of custom applications that provide content services discussed above in a proprietary manner. There is also a large range of platform specific content management systems which store and retrieve content in a platform specific way. There is a need for a platform neutral standard to handle the points made above. None of the existing solutions describe how content services can be provided around content applications such as eForms in a standard and simple manner.

By using Atom as the protocol for accessing and storing content in a platform-independent CMS and hide the underlying CMS, standard feed readers and other applications can access the data being managed by the content management system. Now a feed reader could act as one potential client to the CMS. It will display the content and allow users to interact with the content. The feed reader requires the user to provide an URL for the content the user is interested in subscribing to. The server and resource to which this URL is bound returns an Atom-based feed which the feed reader interprets and presents the result of the URL to the user.

Submitted forms in the content management system can be available to any standard feed reader.

XQuery enables content services around the content. XQuery enables the architecture of the present invention to express what data is needed and how to present that data. XQuery allow content applications to exploit content services with minimal programming other than defining a query expression.

The feed reader uses a URL as an input. Since the XQuery and XQueryX syntax is not URL friendly, the syntax cannot be express in a standard URL without encoding. The Atom specification does not include an optional XQuery statement via a Get operation. To get around this problem, an XLink LinkBase has been created as part of the present invention which maintains the URL-to-XQuery relationship. A LinkBase makes it easier to manage these links because it gathers together a number of related linking elements. The XQuery statement is saved as a document in the content management system. The LinkBase enables the XQuery document to be URL addressable and more XQuery documents can be register with the LinkBase. As part of the invention, a service which interprets URL parameters which can be passed down to the XQuery document as an input has been created. This service is called an XQuery parameter provider. This process will enable simple URLs for the feed readers and users.

EForm has a special need for a summary view. It allows user to view small pieces of entered data from multiple submitted forms. Summary views for eForms can be expressed via the atom: category element. This enables the user to view a summary of submitted eForms and the individual fields inside of that eForm.

For transformations on content elements, custom XPath functions are used to invoke a pipeline of transformations to be invoked before returning the results of a particular query. The Xpath language includes a large set of standard functions for converting and transforming data, but not all cases that were mentioned above could be covered by these functions. Depending on criteria of the request and data type elements to be returned, a rule set may need to be applied to determine the order of transformations to be applied before returning data in the feed. UIMA could also be the implementation for these transformations.

The system 100 of present invention is shown in FIG. 1.

1. User A 102 is connected to a feed reader program ("Atom News Reader") 104. In this example, user wishes to subscribe to an eForm library. This library manages all the submitted forms for a given form type and is located in content repository 138.

2. User A 102 has been given a set of URLs by his/her administrator. User A 102 enters the URL address 106 into the feed reader 104. Example of the URL: http://mycomp.com/contentmanager/formlibrary/form-type-1/defaultview 3. The content management system 108 receives the URL request 106 from the feed reader 104. If the URL request 106 uses a GET method as defined in the Atom publishing protocol ("APP"), the content management system 108 queries the LinkBase 110 for the corresponding XQuery document 116 that is associated with the URL. Since the URL doesn't have any query parameters, the query parameter provider 112 will not be invoked. If URL query parameters were included in the URL, the query parameter provider 112 will be invoked via a custom XPath function named wfx:get-url-query-parameter. An example of code implementing XPath function is depicted below.

```
class XQueryParameterProvider extends XPathFunction
{
    private String requestURI;
    private Map map;
    public XQueryParameterProvider(String requestURI)
    {
        this.requestURI = requestURI;
        this.map = parse(requestURI);
    }
    private Map parse(String requestURI2)
    {
        String[ ] nameValuePair = requestURI2.split("&");
        for (int i = 0; i < nameValuePair.length; i++)
        {
            String[ ] nameValue = nameValuePair[i].split("=");
            this.map.put(nameValue[0], nameValue[1]);
        }
        return null;
    }
    //xpath function implementation
    public String getURLQueryParam(String paramName)
    {
        return (String) this.map.get(paramName);
    }
}
<tns:registry xmlns:tns="http://www.ibm.com/forms/xpath-service"
    xmlns:xsi="http://www.w3.org/2001/XMLSchema-instance"
    xsi:schemaLocation="http://www.ibm.com/forms/xpath-service xpath-function-schema-definition.xsd ">
    <tns:registry-entry functionNamespace="http://www.ibm.com/cms/wfx"
    functionName="get-url-query-parameter"
    implementation="com.ibm.wfx.XQueryParameterProvider"
    method="getURLQueryParam"/>
</tns:registry>
```

The content manager system 108 executes the given XQuery document and produces an XML document which is returned back to the requester, in this case, the feed reader application 104. The content repository (data store) contains the form instance (form with filled out data), and the CMS uses the instance when processing the request. CMS handles all of the logic for the request while the content repository contains all of the data. The linkbase handles the logic for obtaining the XQuery document from the content repository. The form instance is stored in a library (directory) for that form type. All the information is stored inside the content repository. The URL specifies the form library and form type. E.g., http://mycomp.com/contentmanager/<form library>/<form type>/defaultview]

In the cases where the user 102 wishes to read an item from the content repository 138, the read request as a URL is delivered to the feed reader 104 which forwards the URL request to the CMS 108. CMS 108 queries the LinkBase for the corresponding XQuery document. Because it is an URL query, the URL parameters need to be mapped to XQuery parameters so the URL is passed to the XQuery Parameter Provider 112 which maps the XQuery parameters to URL parameters and passes it back to LinkBase 110 which pulls the corresponding XQuery document 116 and delivers it to CMS 138 as a query. CMS 138 sends this XQuery document to the content repository and the content repository responds with an XML document. The response is sent as an XML document 118 which forwards the document as a feed in Atom format to Feed Reader 104 which forwards to User 102.

Below is an example of sample code for performing this function:

```
class CMSSystem
{
    private Document handleRequest(String requestURI)
    {
        XQueryParameterProvider paramProvider = null;
        if(hasParams(requestURI))
            paramProvider = base.getParamsProvider(requestURI);
        LinkBase base = new LinikBase( );
        Document xqueryDoc = base.getDocument(requestURI);
        Document result = executeQuery(xqueryDoc,requestURI,
        paramProvider);
        return result;
    }
    .....
}
```

XQuery uses XPath expression syntax to address specific parts of an XML document. It supplements this with a SQL-like "FLWOR expression" for performing joins. A FLWOR expression is constructed from the five clauses after which it is named: FOR, LET, WHERE, ORDER BY, RETURN. The WHERE clause can be used to support searching and filtering while the ORDER BY clause can be used to support sorting.

Figure 2:
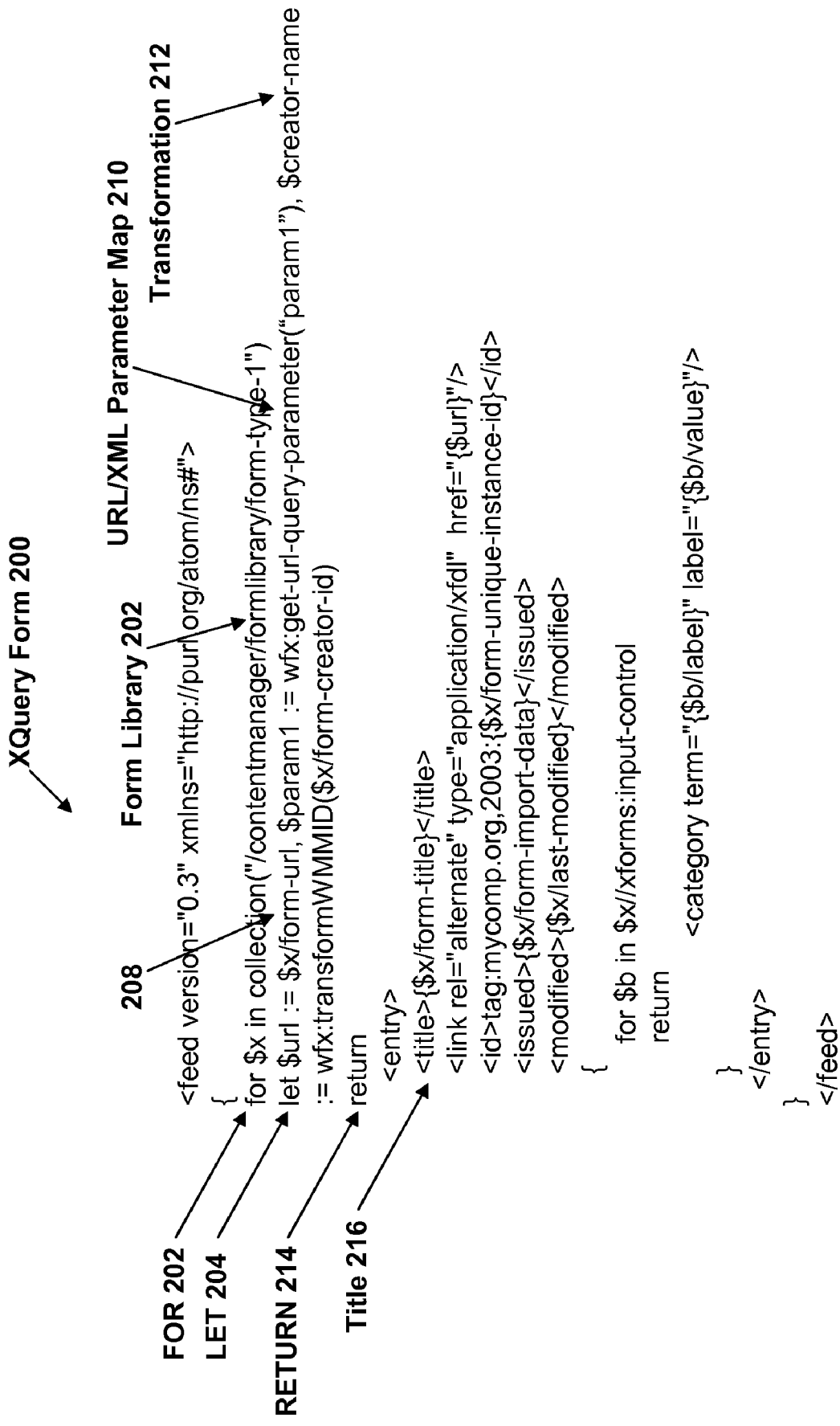
FIG. 2 is an exemplary depiction of the coding associated with an XQuery form.
Figure 5:
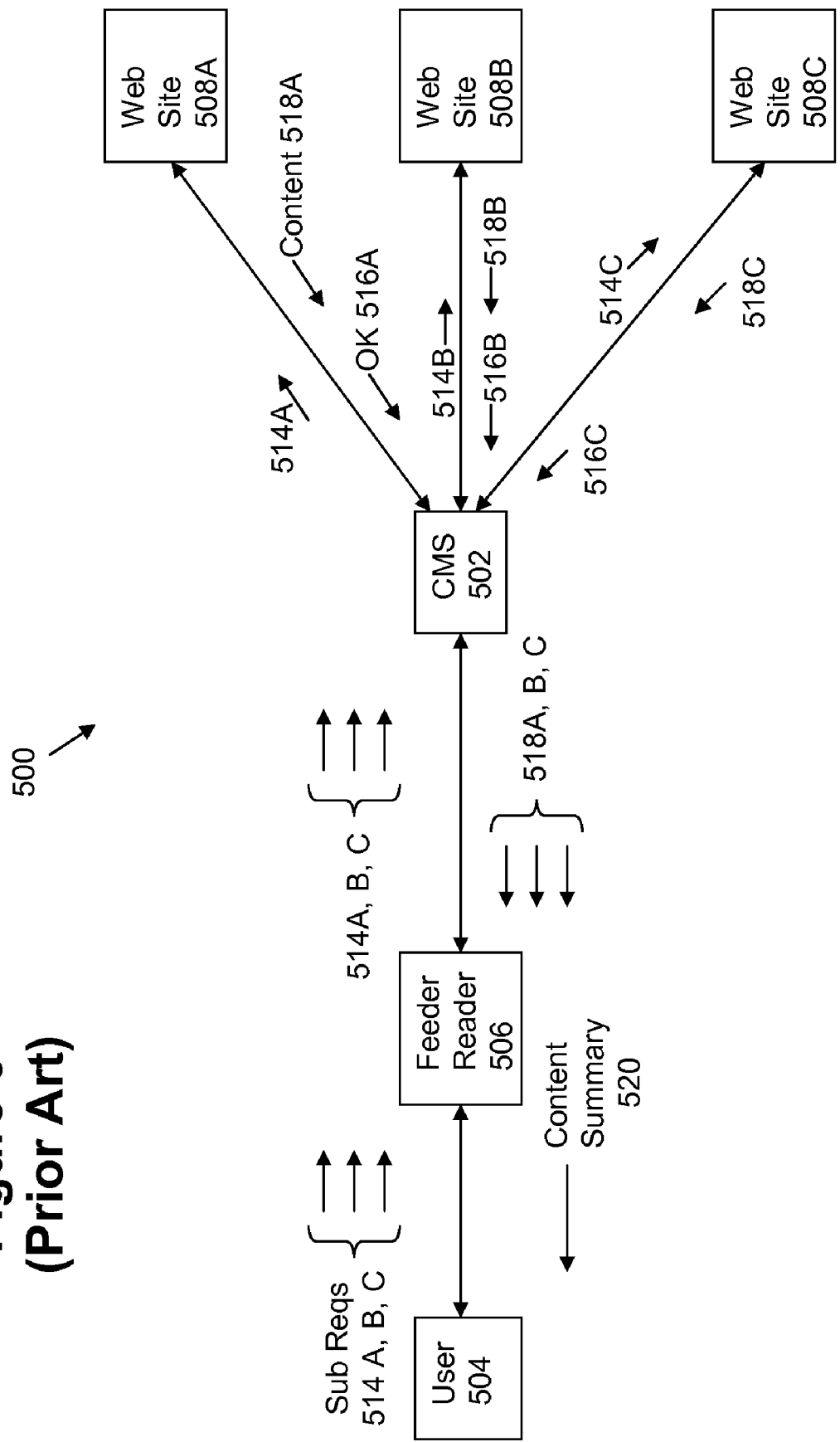
FIG. 5 is a depiction of a web or content feed system where content providers feed content to users via feed readers.

An example of an XQuery is shown in FIG. 2. FOR 202 processes forms in the form library 204. LET 206 declares variables such as URL, Paraml which is the parameter mapper from URL to XML and Creator-name which provides the transformation between WMMID and form-creator-id. RETURN 214 identifies what should be returned and how it should be returned. For instance, the title 216 should be returned.

An example of a return XML Document 300 having Form 1 and Form 2 data is shown in FIG. 3. Form 1 has Title 302 "Form 1", ID 303, a Time and Date Issued element 304, a Time and Date Modified element 306 and Terms 308, each having attributes 318, 320. Likewise, Form 2 has Title 309 "Form 2", ID 310, a Time and Date Issued element 312, a Time and Date Modified element 314 and Terms 316, each having attributes 322, 324.

4. The feed reader will receive this feed and interpret the atom:category as column for the summary view. Atom categories will be used to separate the different column for the summary view. Categories 326a, b, c of FIG. 3 illustrate the data which is used as atom:category in Atom format to create columns. FIG. 4A shows an image 400A which illustrates what a summary view looks like although this is not an image of an actual feed reader. Image 400A has columns 402A, 403A and rows 404A, 406A and 408A. FIG. 4B illustrates the summary 400B which would appear as a result of the XML Return Document 300 of FIG. 3. It has columns 402B, 403B and 405B which correspond to categories 326a, b and c of FIG. 3. Row 404B has the values of the category terms 308, 316 while rows 406B, 408B of the labels of each of Form 1 and Form 2.

The present invention can also address unstructured content that is converted to structured content via UIMA. Unstructured data or information refers to masses of (usually) computerized information which do not have a data structure which is easily readable by a machine. Examples of unstructured data may include audio, video and unstructured text such as the body of an email or word processor document. IBM's Unstructured Information Management Architecture (UIMA) is a software architecture for developing and deploying unstructured information management (UIM) applications. It is a framework that enables developers to transform unstructured content into partly structured content that can be organized and searched.

In the present case, UIM application 160 is shown in FIG. 1 transforming unstructured content to structured content prior to delivering the feed to the feed reader 104.

Figure 6:
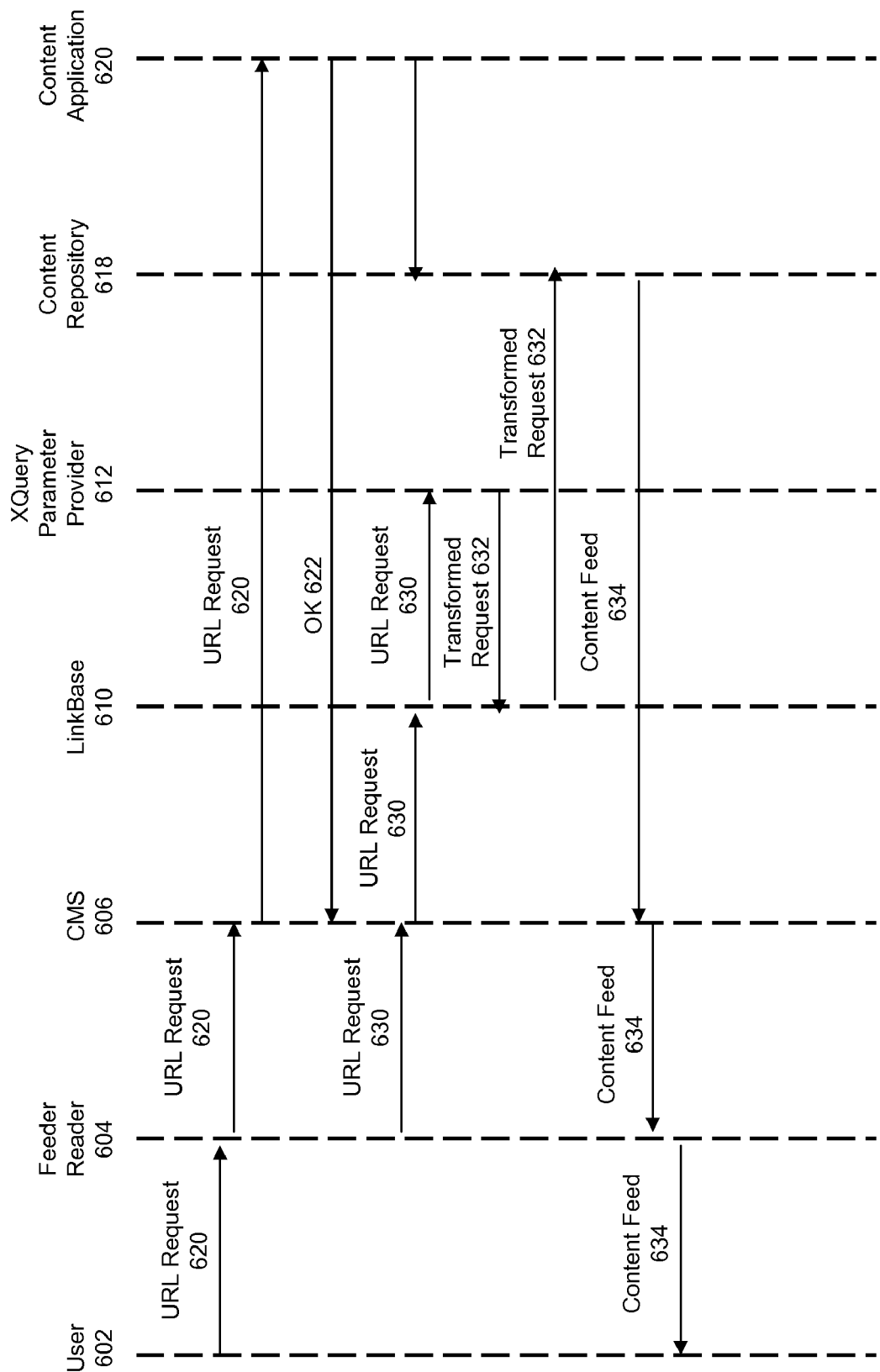
FIG. 6 is a message flow showing the message flows of requesting a subscription and receiving content based upon that subscription of the method of the present invention.

The system 600 of the present invention is shown in FIG. 6. User A 602 is connected to a feeder reader 604. In this example, a user may wish to use or subscribe to, for example, a content application 620.

User A 602 has been given a set of URLs by his/her administrator. User A 602 enters the URL request 620, 630 into the feeder reader 604. The content management system (CMS) 606 receives the URL requests 620, 630 from the feeder reader 604. If the URL request uses a GET method as defined in the Atom publishing protocol ("APP"), the content management system 606 queries the LinkBase 610 for a corresponding XQuery document that is associated with the URL. When, for example, the URL does not have any query parameters, the query parameter provider 612 will not be invoked. If URL query parameters were included in the URL, the query parameter provider 612 will be invoked via a custom XPath function named wfx:get-url-query-parameter.

The content manager system 606 executes the given XQuery document and produces an XML document which is returned back to the requester, in this case, the feeder reader application 604. The content repository (data store) 618 contains the form instance (form with filled out data) or content feed 634 and the CMS 606 uses the instance when processing the request. CMS 606 handles all of the logic for the request while the content repository 618 contains all of the data and feeds. The Linikbase 610 handles the logic for obtaining the XQuery or content feed 634 from the content repository. All the information or feeds are stored inside the content repository 618.

In the cases where the user 602 wishes to read an item from the content repository 618, the read request as a URL 630 is delivered to the feeder reader 604 which forwards the URL request to the CMS 606. CMS 606 queries the LinkBase 610 for the corresponding XQuery document. Because it is an URL query, the URL parameters need to be mapped to XQuery parameters so the URL 630 is passed to the XQuery Parameter Provider 612 which maps the XQuery parameters to URL parameters and passes it back to LinkBase 610 which pulls the corresponding XQuery document and delivers it to CMS 606 as a query. CMS 606 sends this XQuery document to the content repository 618 and the content repository responds with an XML document.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A platform-independent system for providing at least one content feed from at least one content application to a user via a standard feed reader supporting the XML language ("XML") and the Atom format, the system comprising:

a. a content management system ("CMS") connected to the feed reader for receiving content requests from the feed reader and for transmitting content feeds based upon the content requests, the content requests in URL format and the content feeds comprising XML documents adhering to the Atom format;

b. a content repository connected to the CMS for receiving content requests from and for passing content feeds to the CMS, the content requests in XQuery document format and content feeds in XML document form; and c. a linkbase connected to the CMS for receiving content requests in URL format, the linkbase having an XQuery Parameter Provider holding URL parameter/XQuery parameter relationships and for converting URL parameters in the content request and passing the corresponding XQuery parameters to the linkbase, the linkbase passing content requests having the corresponding XQuery parameters in XQuery document form to the CMS for forwarding to the content repository to obtain the requested content.

2. The system of claim 1 wherein the CMS has an Unstructured Information Management Architecture ("UIMA") application for converting unstructured content to structured content prior to delivering the content feed to the user.

3. The system of claim 1 wherein the content feeds have content elements having characteristics and the user providing user desired characteristics, and further wherein the CMS transforms the characteristics of the content elements to the user desired characteristics using XPath functions prior to delivering the content feeds to the user.

4. The system of claim 1 wherein the content feeds have content elements having characteristics and the user providing user desired characteristics, and further wherein the CMS transforms the characteristics of the content elements to the user desired characteristics using an Unstructured Information Management Architecture ("UIMA") application prior to delivering the content feeds to the user.

5. The system of claim 1 wherein the content feed has category elements representing columns so that the feed reader may receive the content feed and interpret the column elements as columns to present a summary view to the user.

6. The system of claim 1 wherein the CMS periodically polls the content repository to determine whether there is new content and, if so, the CMS receives the new content and delivers it to the feed reader.

7. The system of claim 6 wherein the content request specifies the characteristics of the content request including subject matter and the CMS receives content from the content repository according to the specified characteristics and subject matter.

8. A method for providing in a platform-independent system for providing at least one content feed from at least one content application to a user via a standard feed reader supporting the XML language ("XML") and the Atom format, the method comprising the steps of:

a. receiving, at a content management system ("CMS"), from the feed reader, a URL from the feed reader b. receiving, at a linkbase, the URL, from the CMS;

c. determining whether the URL comprises a query;

d. if so, a. receiving, at an XQuery parameter provider, the URL and converting URL parameters in the URL and passing the corresponding XQuery parameters to the linkbase, and, from the linkbase, delivering an XQuery document associated with the URL to the CMS, the CMS passing the XQuery document to the content repository to retrieve the requested content;

b. from the content respository, delivering to the CMS, an XML document having the requested content associated with the received URL; and c. from the CMS, delivering to the feed reader, the XML document in Atom format; and e. if not, from the CMS, delivering to the feed reader, an XML document associated with the received URL.

9. The method of claim 8 wherein the CMS has an Unstructured Information Management Architecture ("UIMA") application, the method further including the step of, at the UIMA, converting unstructured content to structured content prior to delivering the content feed to the user.

10. The method of claim 8 wherein the content feeds have content elements having characteristics, the method further having the steps of, at the CMS, receiving, from the user, user desired characteristics for the content elements, and, at the CMS, transforming, the characteristics of the content elements to the user desired characteristics using XPath functions prior to delivering the content feeds to the user.

11. The method of claim 8 wherein the content feeds have content elements having characteristics, the method further having the steps of, at the CMS, receiving, from the user, user desired characteristics for the content elements, and, at the CMS, transforming, the characteristics of the content elements to the user desired characteristics using an Unstructured Information Management Architecture ("UIMA") application prior to delivering the content feeds to the user.

12. The method of claim 8 further comprising the step of providing the content feed with category elements representing columns so that the feed reader may receive the content feed and interpret the column elements as columns to present a summary view to the user.

13. The method of claim 8 further having the steps of, from the CMS, periodically polling the content repository to determine whether there is new content and, if so, at the CMS, receiving the new content and delivering it to the feed reader.

14. The method of claim 13 further having the steps of, at the CMS, receiving required characteristics of the content request including subject matter and, at the CMS, receiving content from the content repository according to the specified characteristics and subject matter.

15. A computer program comprising program code stored on a computer-readable medium, which when executed, enables a computer system to implement the following steps for providing in a platform-independent system for providing at least one content feed from at least one content application to a user via a standard feed reader supporting the XML language ("XML") and the Atom format, the computer program comprising the steps of:

a. receiving, at a content management system ("CMS"), from the feed reader, an URL from the feed reader b. receiving, at a linkbase, the URL, from the CMS;

c. determining whether the URL comprises a query;

d. if so, a. receiving, at an XQuery parameter provider, the URL and converting URL parameters in the URL and passing the corresponding XQuery parameters to the linkbase, and, from the linkbase, delivering an XQuery document associated with the URL to the CMS, the CMS forwarding the XQuery document to the content repository to retrieve the requested content;

b. from the content respository, delivering to the CMS, an XML document having the requested content associated with the received URL; and c. from the CMS, delivering to the feed reader, the XML document in Atom format; and e. if not, from the CMS, delivering to the feed reader, an XML document associated with the received URL.

16. The computer program of claim 15 wherein the CMS has an Unstructured Information Management Architecture ("UIMA") application, the method further including the step of, at the UIMA, converting unstructured content to structured content prior to delivering the content feed to the user.

17. The computer program of claim 15 wherein the content feeds have content elements having characteristics, the method further having the steps of, at the CMS, receiving, from the user, user desired characteristics for the content elements, and, at the CMS, transforming, the characteristics of the content elements to the user desired characteristics using XPath functions prior to delivering the content feeds to the user.

18. The computer program of claim 15 wherein the content feeds have content elements having characteristics, the method further having the steps of, at the CMS, receiving, from the user, user desired characteristics for the content elements, and, at the CMS, transforming, the characteristics of the content elements to the user desired characteristics using an Unstructured Information Management Architecture ("UIMA") application prior to delivering the content feeds to the user.

19. The computer program of claim 15 further comprising the step of providing the content feed with category elements representing columns so that the feed reader may receive the content feed and interpret the column elements as columns to present a summary view to the user.

20. The computer program of claim 15 further having the steps of, from the CMS, periodically polling the content repository to determine whether there is new content and, if so, at the CMS, receiving the new content and delivering it to the feed reader.

21. The computer program of claim 15 further having the steps of, at the CMS, receiving required characteristics of the content request including subject matter and, at the CMS, receiving content from the content repository according to the specified characteristics and subject matter.

* * * * *